No. 700,003. Patented May 13, 1902.
C. O. ANDERSON.
CLOTHES LINE REEL AND STRETCHER.
(Application filed Mar. 5, 1901.)
(No Model.)
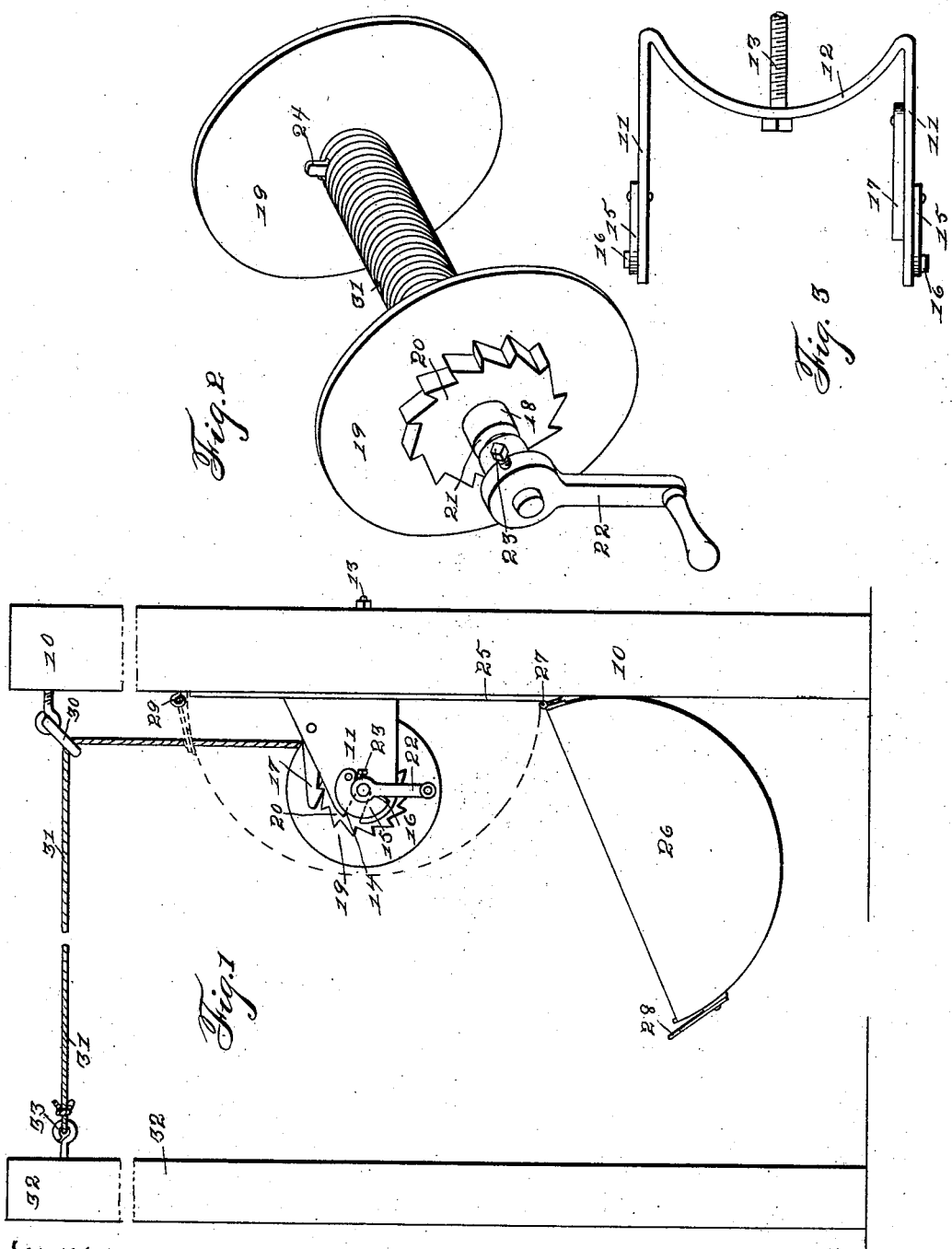
Witnesses
F. C. Stuart
R. C. Orwig
Inventor Carl O. Anderson
by Orwig & Lane Attys.
THE NORRIS PETERS CO., PHOTO-LITHO., WASHINGTON, D. C.

UNITED STATES PATENT OFFICE.

CARL O. ANDERSON, OF DES MOINES, IOWA, ASSIGNOR TO H. HERMAN, OF DES MOINES, IOWA.

CLOTHES-LINE REEL AND STRETCHER.

SPECIFICATION forming part of Letters Patent No. 700,003, dated May 13, 1902.

Application filed March 5, 1901. Serial No. 49,698. (No model.)

*To all whom it may concern:*

Be it known that I, CARL O. ANDERSON, a citizen of the United States, residing at Des Moines, in the county of Polk and State of Iowa, have invented certain new and useful Improvements in Clothes-Line Reels and Stretchers, of which the following is a specification.

The objects of my invention are to provide a reel and stretcher frame or support capable of being securely fastened to a round or square post or support by means of one or more bolts.

A further object is to provide a reel and stretcher that may be readily, quickly, and easily detached from the support, so that after the clothes-line is wound thereupon the entire reel carrying the line may be removed and taken into a house.

A further object is to provide a reel and stretcher designed to be located at a point upon a post where convenient access may be had thereto for operating the reel-crank and the clothes-line passed from the reel upwardly through a pulley or ring before being extended horizontally.

A further object is to provide an improved cover designed for use in inclosing the reel and clothes-line bodily when the line is wound upon the reel.

By the use of my improved cover the entire cover is turned downwardly when the clothes-line is in use, so that the line may be run upwardly from the reel to an elevated pulley, and then when the line is wound upon the reel the cover may be closed quickly and easily in such a manner as to securely protect the clothes-line.

My invention consists in certain details in the construction, arrangement, and combination of the various parts of the device, whereby the objects contemplated are attained, as hereinafter more fully set forth, pointed out in my claim, and illustrated in the accompanying drawings, in which—

Figure 1 shows a side elevation of the reel and stretcher attached to a post and also showing the cover in an open position and by dotted lines indicating the closed position of the cover. The line is shown passing upwardly and outwardly through a ring to a stationary support. Fig. 2 shows in perspective the shaft and attached parts of the reel, also showing a clothes-line wound thereupon; and Fig. 3 shows a top or plan view of the frame for supporting the reel.

Referring to the accompanying drawings, I have used the reference-numeral 10 to indicate an upright post. The reel-frame is made of one piece of metal and comprises two parallel sides 11 and a central portion 12, connecting the sides and curved to conform to the contour of a round post. One or more bolts 13 are passed through the central portion of the part 12 to enter a post. Obviously if the device is intended to be fastened to a flat surface the inner edges of the parts 11 will rest against said flat surfaces and the bolt or bolts 13 will firmly secure the bracket in place. In the outer ends of the parts 11 are the slots 14, designed to receive the reel-shaft, as hereinafter described. Pivoted to the outer surfaces of the sides 11 are the holders 15, which are semicircular in shape and designed to overlap the slots 14. The free ends of said holders are turned outwardly at 16, whereby they can be more conveniently grasped. Pivoted to one of the sides 11 is a gravity-pawl 17.

The numeral 18 is used to indicate the reel-shaft. The flanges 19 are formed integral therewith near its opposite ends, a ratchet-wheel 20 is also formed on one of its end portions outside one of the flanges 19, and an annular groove 21 is formed therein near its end to enter one of the slots 14, while the other end of the reel-shaft is extended beyond the other flange 19 thereon and is of the same construction as the end shown in Fig. 2. A crank 22 is detachably fixed to one end of the shaft by means of the set-screw 23, and a projection 24 is formed on the central portion of the shaft to provide means whereby the end of a rope may be attached thereto. In use this portion of the device is used as follows: Assuming that it is desired to place the reel in the frame, the semicircular holders 15 are elevated and the axle 18 inserted in the slots 14, after which the holders 15 are turned downwardly into the position shown in Fig. 1. When this is done, the pawl 17 will be in engagement with the ratchet 20, thus preventing a backward movement of the axle and holding the clothes-line taut when it is stretched. When it is desired to wind up the clothes-line, the crank 22 may be rotated and the line thereby wound upon the axle. When this is done, the pawl 17 is turned upwardly out of engagement with the ratchet-wheel and the semicircular holders are turned upwardly, so as to permit the reel to be detached from the support.

The cover for the entire reel comprises a back piece 25, secured to the upright support, and a box 26, open at one side, hinged to the bottom of the back 25 by means of hinges 27, said box being of a size to completely cover the reel when swung upwardly. A hook 28 is pivoted to the box 26 to enter a screw-eye 29 or similar support. Obviously this box may be used to cover the reel and bracket when it is not desirable to take the reel from its support.

The elevated ring, which may be used to support a pulley, is indicated by the reference-numeral 30, the clothes-line by the numeral 31, the second post by the numeral 32, and the screw-eye to which the end of the clothes-line is attached is indicated by the reference-numeral 33.

From the foregoing description it is obvious that the reel proper may be readily and quickly attached to or detached from its support, so that the clothes-line may be readily taken into the house when not in use. Furthermore, the reel may be located upon the post in any position that will be most accessible and the clothes-line passed upwardly and through an elevated ring or pulley before passing horizontally. It will also be noted that when not desiring to remove the clothes-line and reel they may be securely inclosed by the hinged box 26.

Having thus described my invention, what I claim, and desire to secure by Letters Patent of the United States therefor, is—

An improved clothes-line reel and stretcher, comprising in combination a support provided with sides 11, having the slots 14 therein, and having a curved back 12, a pawl pivoted to one side of said support, semicircular holders 15 pivoted to the supports adjacent to the slots 14, an axle 18, flanges 19 thereon, a ratchet 20 thereon, and a crank 22 thereon, said axle being designed to enter the slots 14, and a back 25, a box 26 open at one side, and hinged to the back, and means for securing the free end of the box to the upper end of the back, whereby the reel and stretcher may be inclosed, substantially as, and for the purposes stated.

CARL O. ANDERSON.

Witnesses:
J. RALPH ORWIG,
W. R. LANE.